June 26, 1923.   1,459,864
A. TAYLOR ET AL
ERECTING PRISM FOR TELESCOPES AND OTHER OPTICAL INSTRUMENTS
Filed July 20, 1920

Witnesses.

Inventor.
Alfred Taylor
Harold Dennis Taylor
By Sturtevant & Mason
Attorneys

Patented June 26, 1923.

1,459,864

UNITED STATES PATENT OFFICE.

ALFRED TAYLOR AND HAROLD DENNIS TAYLOR, OF YORK, ENGLAND.

ERECTING PRISM FOR TELESCOPES AND OTHER OPTICAL INSTRUMENTS.

Application filed July 20, 1920. Serial No. 397,712.

*To all whom it may concern:*

Be it known that we, ALFRED TAYLOR and HAROLD DENNIS TAYLOR, subjects of the King of Great Britain, residing in York, in the county of York and Kingdom of England, respectively, have invented certain new and useful Improvements in Erecting Prisms for Telescopes and Other Optical Instruments, of which the following is a specification.

The usual method of erecting the primary inverted image in the popular prismatic telescope is well-known to consist in the introduction of two crossed right angled prisms between the objective and its primary image and it is well known that their relative shape and disposition renders it very difficult to fix them in a really satisfactory manner or to cement them together into one whole whereby the light lost at two transmitting surfaces could be saved.

This invention has for its objects:—1st a more manageable form and shape for the prisms and 2nd, forming the whole erecting prism of one piece of glass only.

In our own special type of erecting prism, it is arranged that the entrance transmitting surfaces shall make the same angle with the axis of the prism as the opposite reflecting surfaces. By the axis of the prism is meant the straight line AB in Fig. 1 drawn through A and through and perpendicular to the roof edge DE.

Figure 1:
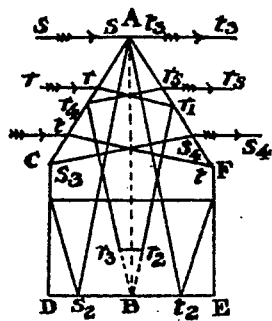

For instance, Fig. 1 shows an end view of such a prism and Fig. 1$^a$, a side view. The angle CAF is dependent on the refractive index of the glass used. Supposing it to be 1.508 and 1.509 then if total reflection is required from the surfaces AC and AF, the central rays must impinge upon these internally and at an angle of no less than 45°, with the said surfaces. To this end, the angle CAF should be 66°, or 33°, on either side of the axis AB. Then the central ray $r$—$r$, entering AC perpendicular to A—B, is refracted down to $r_1$, where it is reflected totally down to $r_2$, (and as seen in plan in Fig. 1, down towards the centre of the roof edge) on one of the roof surfaces where it is totally reflected down to $r_3$, on the other roof surface and then reflected totally up to $r_4$ where it is totally reflected to $r_5$, and there refracted outwards along the course of $r_5$—$r_5$ parallel to but not coincident with its original path $r$—$r$.

Figure 2:
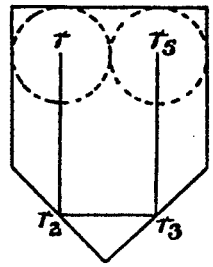
Figure 2:
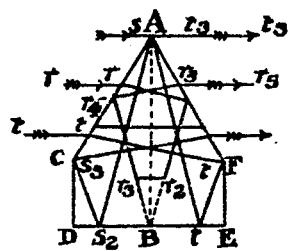

In the same way the ray $s$—$s$, is refracted and reflected down to $s_2$, on the ridge then up to $s_3$ and $s_4$, where it is refracted outwards parallel to $r_5$—$r_5$. It will now be seen that each surface AC and AF is both reflecting and refracting. The length of axis from A to B in this instance must be 2.66, to 2.7, times the aperture of the beam or the distance between the rays $s$—$s$, and $t$—$t$, and can be considerably curtailed if a glass of higher refractive index be used. For instance if the refractive index be 1.62, the length A to B should be about 1.8, times the aperture of beam and the angle CAF be 60°. The glass path in the first case of refractive index equals 1.509, is 5.65 times the aperture and the width DE is 1.72 times the aperture. Figures 2 and 2$^a$ show a case in which the internal reflections from AC to AF are not total so that these surfaces must be silvered but the arrangement permits of the length AB being only 1.95 times the effective aperature of beam (the width DE being 1.565 times the aperture while the glass path is 4.14, times the aperture). Here the angle at A is 62½° and the refractive index 1.509 as before.

Figure 2$^a$, is the other view of it and the central ray entering at $r$, from the far side emerges finally at $r_5$, on the near side when it is clear that the left half of the near surface and the right hand half of the far surface can both be silvered for internal reflection.

Figure 3:
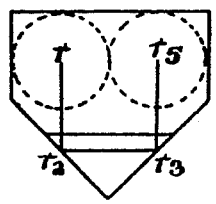
Figure 3:
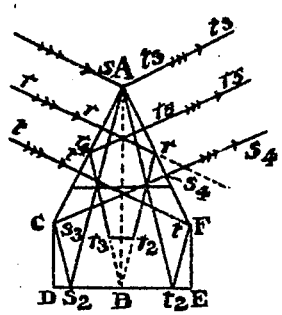

Figures 3 and 3$^a$ show a case in which it is desired to tilt the line of the sight upwards. In this case by 50° 40′. Here the angle CAF is 50° 40′ and the length A to B is 2$\frac{1}{15}$, times the aperture of beam and the width DE 1.4 times the aperture, and the glass path is 4.03 times the aperture. In this case the refractive index does not affect the case and the internal reflections are ultra-total and not requiring silvering. The dimensions we have given suppose that all the intersections of surfaces are sharp edges. In practice slight chamfers are required which will curtail the effective apertures by 2½% to 5%.

We declare that what we claim is:—

1. An erecting system made of one solid piece of glass comprising in structure a central parallel sided portion, a single roof edge prism formed on one side of said portion and a single roof edge prism formed on the opposite side of said portion, the roof edges of the prisms lying at right angles to each other.

2. An erecting system made of one solid piece of glass comprising in structure a central parallel sided portion, a single roof edge prism formed on one side of said portion each roof face forming a transmitting and reflecting surface and a single roof edge prism formed on the opposite side of said portion having its roof edge at right angles to the roof edge of the first prism and its roof faces forming reflecting surfaces.

3. An erecting system made of one solid piece of glass comprising in structure a central parallel sided portion, a single roof edge prism formed on one side of said portion and having two internal reflecting surfaces formed on the roof faces, a single roof edge prism formed on the opposite side of said portion having its roof edge at right angles to the roof edge of the other prism and having two internal intermediate reflecting surfaces on its roof faces the reflecting surfaces of the first prism forming also transmitting surfaces.

4. A roof erecting prism formed of one solid piece having a single roof edge prism formed on each of two of the opposite sides of a central parallel sided portion the vertices of the roof-edged prisms being at right angles to each other.

In witness whereof, we have hereunto signed our names this 1st day of July, 1920, in the presence of two subscribing witnesses.

ALFRED TAYLOR.
HAROLD DENNIS TAYLOR.

Witnesses:
EDWARD B. CIPRIANI,
MARTHA W. BOTTOMLEY.